United States Patent [19]
Edmonson

[11] 3,957,644
[45] May 18, 1976

[54] IN-LINE FILTERING DEVICE

[75] Inventor: Lawrence Aldean Edmonson, Phoenix, Ariz.

[73] Assignee: Lawrence Aldean Edmonson, Garden Grove, Calif.

[22] Filed: Jan. 2, 1974

[21] Appl. No.: 429,962

Related U.S. Application Data

[63] Continuation-in-part of Ser. No. 325,609, Jan. 22, 1973, abandoned.

[52] U.S. Cl. .............................. 210/169; 210/266; 210/299; 210/335; 210/446; 210/448; 210/496

[51] Int. Cl.² .................. B01D 29/00; B01D 35/16; E04H 3/20

[58] Field of Search .......... 210/169, 299, 335, 259, 210/266, 446, 448, 496; 15/1.7; 134/111

[56] References Cited
UNITED STATES PATENTS

| | | |
|---|---|---|
| 3,217,886 | 11/1965 | Ruston ............................ 210/169 |
| 3,240,346 | 3/1966 | Callahan, Jr. et al. ............. 210/448 |
| 3,469,706 | 9/1969 | Kissell ............................. 210/448 |
| 3,689,408 | 9/1972 | Edmiston et al. ................. 210/169 |
| 3,758,276 | 9/1973 | Bond et al. ....................... 15/1.7 |
| 3,767,050 | 10/1973 | Reiner ............................ 210/169 |

Primary Examiner—Charles N. Hart
Assistant Examiner—Richard W. Burks
Attorney, Agent, or Firm—Ronald J. Clark

[57] ABSTRACT

An in-line filter unit is provided for use in a circulating fluid system. Such a unit is made essentially into one piece to insure watertight. A debris reservoir is provided to store the debris removed from the fluid. A diffuser is placed in the line of fluid flow for preventing direct contact by the fluid entering the unit with the filter and for preventing damage to the filter.

12 Claims, 7 Drawing Figures

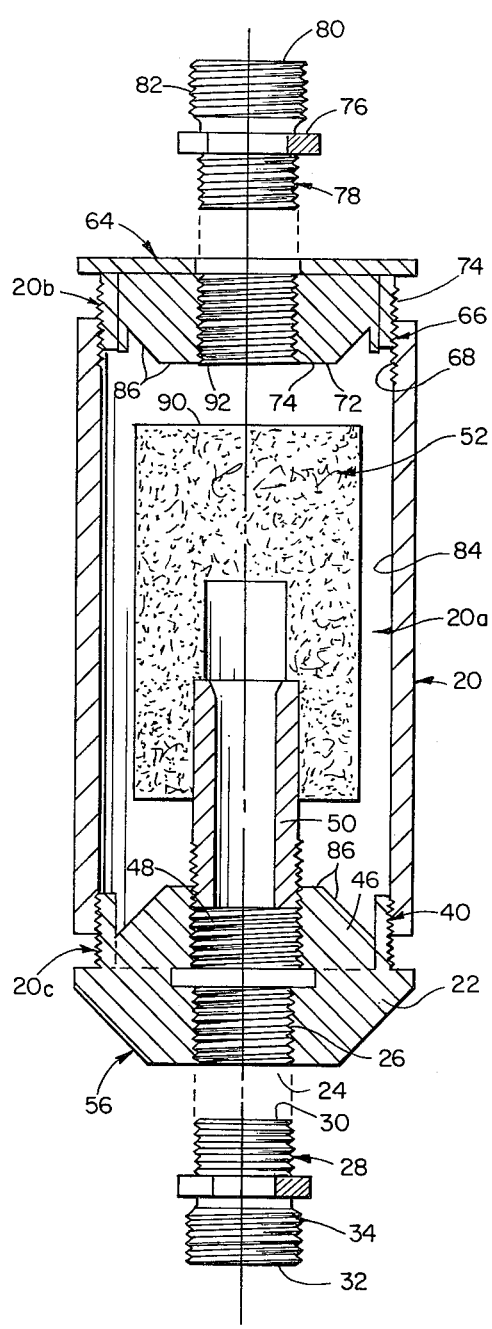
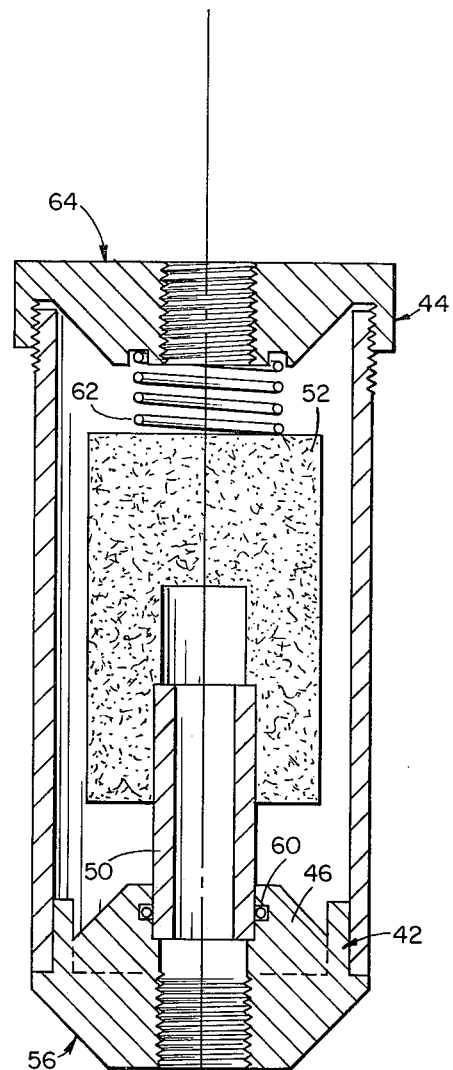
fig.3
fig. 4

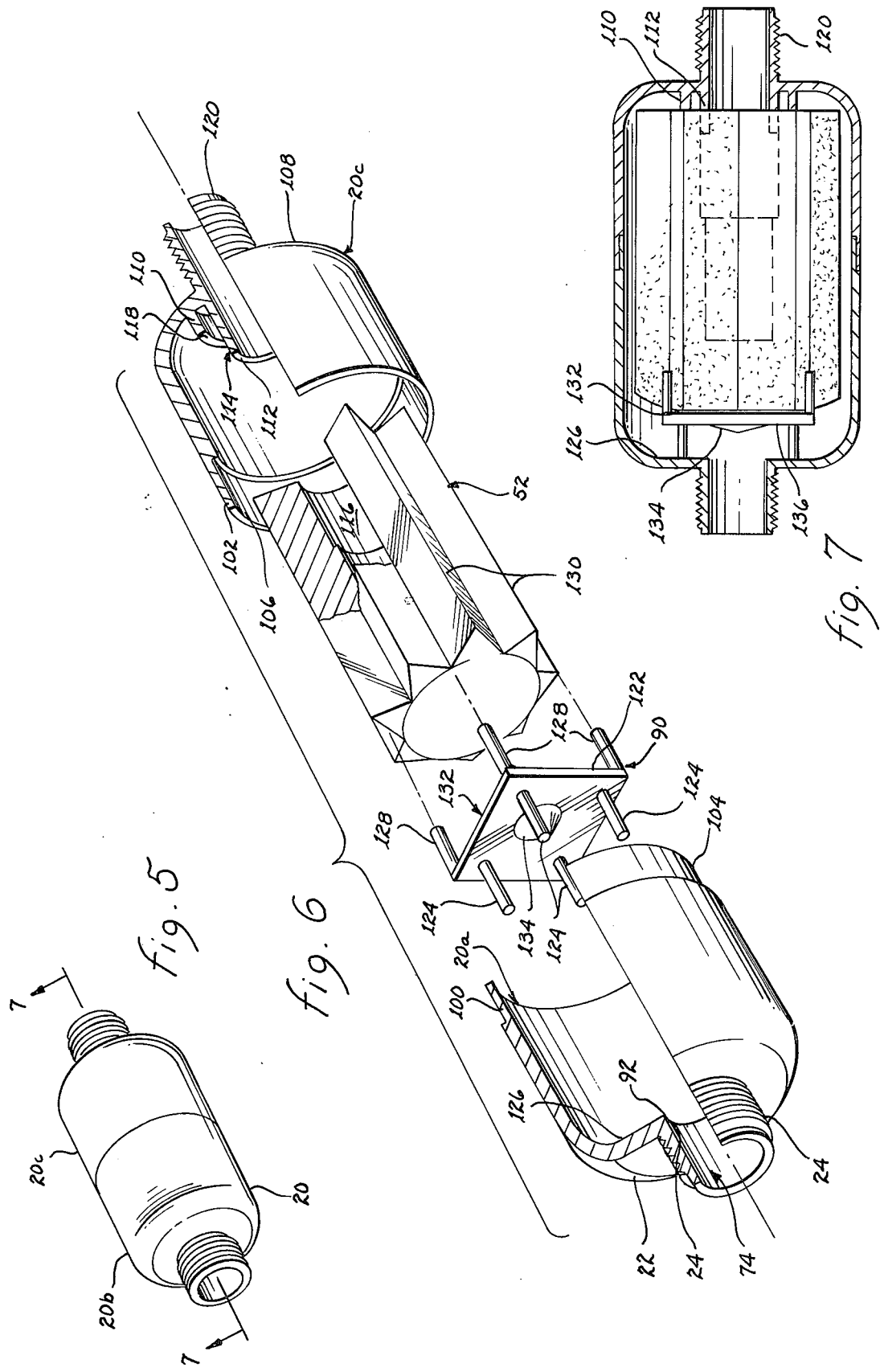

IN-LINE FILTERING DEVICE

This is a continuation in part of my earlier filed U.S. Pat. application, Ser. No. 325,609 filed Jan. 22, 1973 and now abandoned.

BACKGROUND OF THE INVENTION

The in-line filtering unit is necessary for those systems in which the main filter unit is made of material which can be carried out of the main filter by a fluid flow through the main filter unit. In such a filtering system, an additional in-line filtering unit is necessary for removing from the fluid flow any material escaping from the main filter. An additional in-line filter is useful for removing any other unwanted material which bypassed the main filter unit.

Specifically, one such fluid filtering system which can advantageously utilize the additional in-line filter is the filtering system for a swimming pool which utilizes a sand filter as its main filter element.

The swimming pool sand filter works on the same principle as the city water works. The dirty water is pumped from the swimming pool through the filter pump and then into the top portion of the sand filter. There the water is diffused or slowed down in force. The water travels through the sand bed where the dust and debris are trapped between the grains of sand. Such sand filters usually use number 20 or 30 size grain of sand. The filtered water then flows through the underdrain and back into the pool.

The in-line filtering device of the present invention removes from the water flow, any number 20 and 30 sand particles or any other debris passed by the main filter. The sand filters of today pass a few grains of sand back into the pool which are not noticeable under normal filtering conditions.

Automatic cleaning systems for swimming pools are being used in ever increasing numbers. Such automatic cleaning systems are often powered by water pressure developed by a booster pump placed between the output of the main filter and the cleaning equipment positioned in the pool. This cleaning equipment in the pool is normally made of a plastic like material. Those grains of sand passed by the main filter which are not noticeable when automatic equipment is not being used, cause great damage to the plastic like material of the automatic cleaning equipment.

When the water passes through the main filter, there are several paths by which the silica media can escape through the filter underdrain unit and be deposited in the return fluid flow to the swimming pool. Debris and sand which can pass through or around the main filter occurs under many circumstances. For example, after a severe dirt storm, the pool is, of course, extremely dirty. As the automatic cleaning system is working to remove this debris, the cleaning system agitates the water to hold the debris in suspension so that the main drain and the skimmer of the swimming pool can draw the debris out of the pool. The main swimming pool filter becomes dirty and consequently the water flow through the filter slows. When the water flow slows, the automatic cleaning system is still operating and pushes debris and sand and dirt down into the main drain of the pool. As the water flow slows down, this debris stays in the main drain pipe and then when the homeowner backwashes the main filtering system, this debris then is caught in the under drain of the filter and is trapped there. When the homeowner turns the main filtering system back on to filter, then this debris is put back into the main return line back to the pool in which the automatic cleaning system plumbing is attached. This dirt and debris and sand is caught into the main automatic cleaning system.

The debris trapped in the main drain of the swimming pool as just described can also be trapped during backwash in a diatomaceous earth filter.

One of the common occurrences in maintaining a swimming pool is the cleaning of the main filter. This cleaning of the filter is called backwashing. When backwashing either a sand filter or a diatomaceous earth filter, material from the primary filtering unit itself can escape from the inside of the filter into the fluid return line to the pool.

In filters presently in use, the filtering material from which the under drain is made of is of such porous character that sand grains are able to pass therethrough during normal operation. Although the number of sand grains passing through is of very small amount, it will be described hereinafter how these very few grains of sand or for that matter individual grains of sand can damage other expensive equipment associated in maintenance of the swimming pool.

Filtering systems, especially high rate sand filters, are manufactured to include an internal bleed line for passing air out of the interior of the sand filter. The internal bleed line is connected to the output of the filter. In effect the internal bleed line bypasses the filter. If any debris enters the internal bleed line, that debris would bypass the primary filter and be returned to the pool by the return line. Since the cleaning equipment is powered by the return line, this debris would pass through the cleaning equipment.

Debris enters the bleeder line in the following manner. During the filtering operation, the debris and sand in the upper portion of the high rate sand filter swirl and float about and circulate within the entire upper portion of the high rate sand filter. During this circulation, individual particles of sand and/or debris can find their way into the bleeder line which leads to the fluid return line to the swimming pool. This is an additional source of sand and/or debris for the pool return line.

The in-line filter unit is placed in the fluid return line to the swimming pool and removes the sand and debris before they reach the automatic cleaning unit and cause damage to the automatic cleaning unit.

SUMMARY OF THE INVENTION

The present invention relates to filtering systems and more particularly, it relates to a filter system including at least one in-line filtering device in addition to the main filter for removing material passed by the main filter.

It is an object of the present invention to provide an in-line filter device to remove sand and other debris which inadvertently passes through the main filtering system for a swimming pool.

It is another object of the present invention to provide an in-line filter device system adapted for use with the companion equipment normally used in a filtering system for a swimming pool.

It is a still further object of the present invention to provide an in-line filtering unit especially designed so as to cause only a pre-determined small pressure drop between its input and output ports.

It is a further object of the present invention to provide an in-line filter device adapted to be used with a pool sweep cleaning system.

It is an additional object of the present invention to provide an in-line filter device adapted for either horizontal or vertical installation and internally designed to provide an extended maintenance free period.

It is a still further object of the present invention, to provide an in-line filter device having a reservoir and/or chamber adapted to store the grains of sand which have passed through the main filter unit and which are removed from the fluid return line prior to passing through an attached automatic cleaning system.

It is another object of the invention to provide an in-line filter unit of such low cost that it can be made of essentially one piece to insure watertightness and can be discarded after use.

It is also an object of the present invention to design an in-line filter unit of such simple arrangement that it is adapted to be disassembled for cleaning and reassembled for reattachment to a pressurized fluid system.

These and other objects of the present invention will be better understood by reference to the drawings.

FIG. 3 is a sectional view of a first embodiment of the in-line filtering unit.

FIG. 4 is a sectional view of a second embodiment of the present invention.

FIG. 5 is a perspective view of a third embodiment of the present invention.

FIG. 6 is an exploded view of the in-line filter unit shown in FIG. 5.

FIG. 7 is a sectional view of the filter shown in FIG. 5 taken along the lines 7—7.

Figure 1:
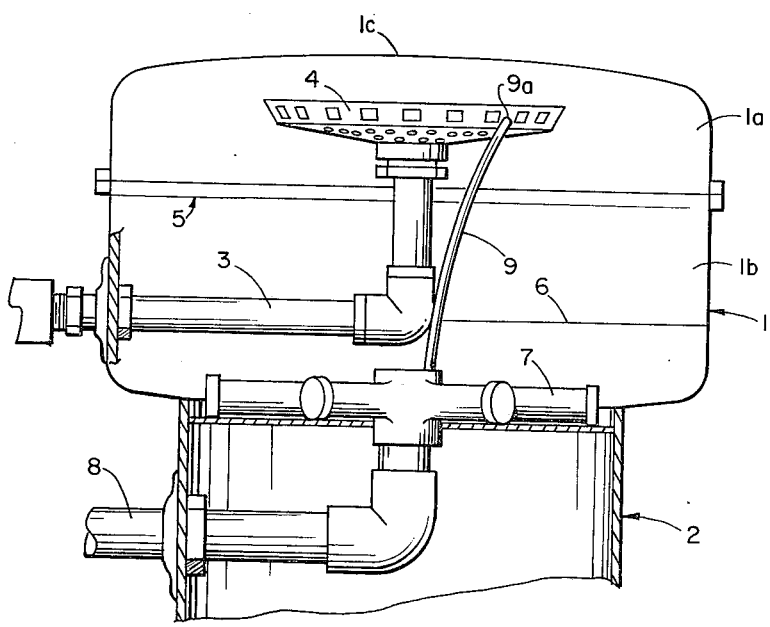
FIG. 1 is a sectional view of a high rate sand filter commonly in use in swimming pool filtering systems.

Referring to FIG. 1 there can be seen a general schematic diagram of a high rate sand filter comprising a housing 1 in which the filtering action occurs. The housing 1 is supported on a base member 2. The housing 1 is divided into an upper portion 1a and a lower portion 1b. The portions can be separated for putting sand into the filter and for maintenance of the filter. The input water pipe is at 3 and the diffuser is at 4. The sand level is shown at 5 and a heavier gravel level is shown at 6. Both the sand and the gravel are used to remove debris from the water received through the input pipe 3. During normal operation, the interior of the housing 1 is completely filled with water. Water from the input pipe 3 is under pressure generated by the water pump 12 shown in FIG. 2. Hence the upper portion of the housing, i.e., between the sand level 5 and the top 1c of the housing 1 is filled with water which is in turmoil. Debris and sand particles are circulating in this entire upper area. The water exits the sand filter by passing through the sand and collected by the open ports (not shown) of the under drain 7. The under drain has a filter unit adapted to hold back sand or any other particle having a diameter smaller than anything larger than 340 microns. This is generally designed to keep the sand wholly within the sand filter. However, as a practical matter, the under drain 7 passes individual grains of sand on a regular basis. The number need not be large in order to cause considerable amount of damage as is hereinafter described. The under drain leads to an exit pipe 8 which is connected up with the remaining part of the system. A bleeder line is shown at 9 having an entry hold at 9a. The other end is connected to the exit pipe 8. Any material passing through the bleeder line bypasses the filter.

Figure 2:
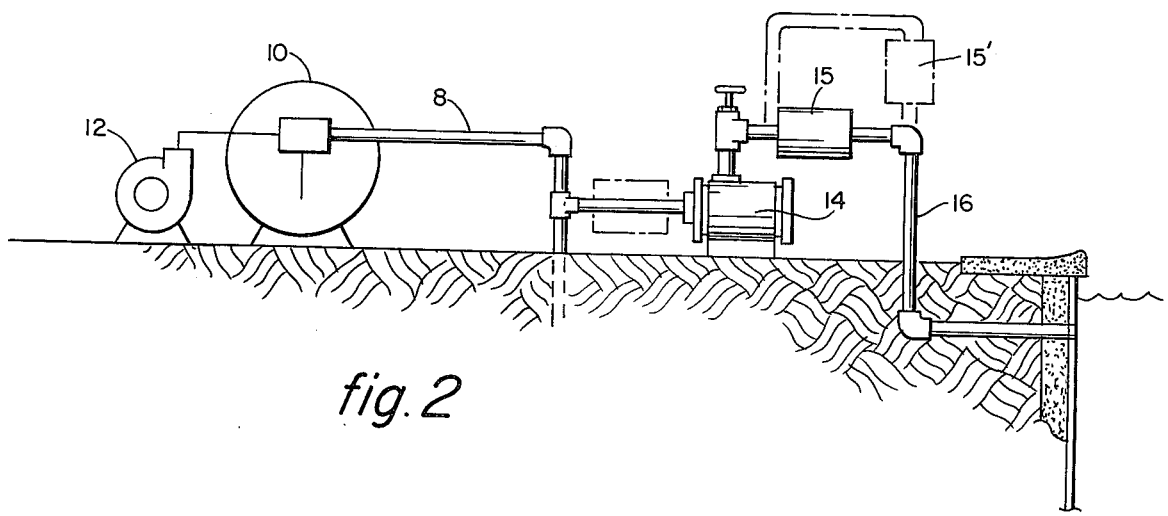
FIG. 2 is a general block diagram showing the entire filtering unit used in a swimming pool, including the in-line filtering system.

Referring to FIG. 2, the sand filter used in a standard pool system is shown at 10 while the filter pump which draws the water out of the pool and pushes it through the filter is shown at 12. The filter exit pipe again is shown at 8 leading to a booster pump 14. It is a function of the booster pump to provide additional water pressure for driving a cleaning system. The pump 14 forces the water through the in-line filter 15 and then through the water return line 16 for driving the automatic pool cleaning equipment. The in-line filter unit can be horizontally mounted as at 15 or vertically mounted as at $15^1$. The water passed by the booster pump 14 is normally applied directly to a gear train within a cleaning system associated with the pool. The water itself provides the motor power for centrifically turning the gear associated with the pool cleaning system. When sand or other debris, but especially sand, is present in this water return line 16 a kernel of sand will find its way into the gear train and cause damage of the following nature. As a grain of sand travels through the pool sweep booster pump and is headed towards the automatic cleaning system control head, that grain of sand can be trapped in the main control head by passing or getting into what we call the valve body. This valve body is part of the control mechanism of the pool sweep. This valve body is inserted into a cavity which has very close tolerances between the valve body and the gear housing. Part of the water that is under pressure that drives the pool sweep, or any other cleaning device, goes into the control head and will go into the control valve or valve body and can be trapped between these close tolerances of the valve body and the gear housing. This trapped particle sand or other debris puts a bind on the valve body which is turned by other types of gears in the control head. Such grains of sand have caused the sweep unit to malfunction and require expensive maintenance and even replacement. The gears have been damaged ultimately by this sand. Prior to such damage to the sweep, the cleaning system becomes inefficient and does not do a proper job. The in-line filter unit has been 100% effective in remedying these problems.

The automatic cleaning system normally includes two units, a control head and some appending whips. The control head floats on the surface of the water and the whips extend into the main part of the pool. A portion of the water coming from the booster pump into the control head is directed to the whips which are used to gyrate and rub against either the sides of the pool and/or the bottom in order to keep debris in suspension.

Another portion of the water which enters into the control head is used to move the control head about the pool in a predetermined pre-engineered fashion which is designed to provide the maximum cleaning power. There is no way of adjusting the pressure used in the cleaning system. The cleaning system responds in a fixed predetermined manner to the amount of pressure supplied by the booster pump. Therefore, anything attached to such a system must not materially change this pressure level or the entire system will become inefficient at best or entirely incapable of doing the precise task it was engineered to perform.

In its original design, the cleaning head is expected to divert sufficient water to the whips to move them adequately over all the internal walls and bottom of the pool as well as move the pool sweep in a random fashion around the upper surface of the water. One of the normal obstacles which the pool sweep is designed to overcome in its movement around the surface of the pool is the sides or steps of the pool itself. A sharp corner or a step impedes the free travel of the pool sweep. The pool sweep must have sufficient power to continue its movements despite these obstructions. In order to have maximum cleaning power, or maximum cleaning sufficiency, the pool sweep has been designed to operate from a certain water pressure. Accordingly, it is critical that any unit interposed between the booster pump and the cleaning head not drop the water pressure to such an extent as to impede the movement of the sweep about the pool. It has been found from experience that a pressure drop of greater than 3 pounds in the water return line 16 can have adverse affects on the sweep system. Accordingly, the in-line filter device of the present invention has been designed to remove the grains of sand and other debris without dropping the pressure to adversely affect the sweep system.

Generally, similar items in the several views will be identified with the same numeral.

In FIG. 3 there can be seen a cross-sectional view of one embodiment of the present invention. Generally, an annular shaped casing 20 is the main housing for the filter unit. Obviously, any shaped housing would be sufficient. The casing defines a central bore as at 20a and an input end 20b and an output end 20c. The unit shown is adapted for disassembly but unitized construction can be followed for making the in-line filter unit. SUch a unitized construction is deemed to be within the purview of the present invention. The housing 20 is the main housing for the filter unit. Obviously, any shaped housing would be sufficient. The housing 20 is equipped with an exit end cap 22 having an axially formed exit port 24 containing a threaded hardware element 24. A suitable element 26 is a ¾ inch pipe thread female. An exit adapter assembly 28 provides a means for connecting the filter unit to the plumbing normally found in a swimming pool system. The assembly 28 includes a means 30 for engaging the threaded element 26, and a means 32 for engaging the plumbing system. In the preferred embodiment, the means 30 and 32 are separate elements. This is not necessary and a single unit can be used. The means 30 in the preferred embodiment is a ¾ inch pipe thread male unit and the means 32 is a ¾ inch brass pipe threaded to garden hose thread nipple having garden hose thread male ¾ inch as at 34.

The end cap 22 is joined to the housing 20 in several standard ways. A threaded engagement is shown at 40 in FIG. 3 while a glue engagement is shown at 42 in FIG. 4. The exit end cap 22 engages the housing 20 by a mating contact on the inside of the housing as at 40 but outside engagement as at 44 is also suitable. A unitized construction might make this one piece.

The end cap 22 is furnished with an annular shaped mounting element 46 forming a threaded bore 48. The function of the element 46 is to receive an element 50, upon which element 50 is mounted on the active filter unit 52 of the present invention.

In the preferred embodiment, the filter unit 52 is a resin bonded quartz filter which is attached to the element 50 by an epoxy adhesive. The element 50 can be a circular shaped ¾ inch nipple having a threaded portion adapted to mate with the threaded portion of the mounting element 46.

The function of the exit end cap assembly 56 is to perform the closure function for one end of the housing 20 in addition to carrying the exit adapter which attaches to the existing plumbing for a swimming pool. Additionally, the end cap assembly carries the active filter element 52. As will be seen more fully hereinafter, this allows for automatic assembly operation as the exit assembly is easily assembled as one unit for attachment to the housing 20.

A second method for assembling the exit cap assembly is shown in FIG. 4 wherein an O-ring 60 is recessed in the element 46 such as to provide an O-ring seal engagement with the nipple 50. The O-ring can be recessed in the nipple 50 as well as in the element 46 as shown. This form of attachment to the exit cap assembly 56 is not as firm as that method shown in FIG. 3, hence a spring unit 62 rests against an imput cap assembly 64 and urges the filter 52 against the nipple 50. The spring 62 can be of stainless steel construction and can be mounted in annular shaped groove 64 in the input cap assembly 62.

Referring back to FIG. 3, the resin bonded quartz filter is used because of its function of passing the quantity of water needed while also being able to stop the very small particles which escape the main filter unit. Additionally, the filter only inserts a 1 to 2 pound drop to the working pressure in its position within the in-line filter unit. The input cap assembly unit 64 is of similar construction to the exit cap assembly 56. It is annular in shape and adapted to mate with the housing element 20. A threaded engagement is shown at 66 between an inner threaded portion 68 of annular cross-section of the housing 20 and an outer annular surface 70 of the input cap assembly 64 which fits within the housing 20.

The input cap assembly includes an annular shaped portion 72 which defines a centrally located bore 74. The bore 74 is threaded to receive an input assembly 76. In the best embodiment the input assembly comprises a ¾ inch pipe threaded male unit 78 adapted to engage the threaded bore 74 and a ¾ inch brass pipe threaded to garden hose nipple 80 having garden hose thread ¾ inch male 82.

The function of the input cap assembly is to function as the input closure member for the housing 20 and provide a means for attaching to the existing plumbing in the swimming pool system. Obviously, both the input cap assembly and the exit cap assembly make a watertight joint with the housing unit 20. These joints can be made as shown but also can be made by various combinations of O-rings carried by either the housing 20 or the cap assemblies 28 and/or 76. Adhesive can be used in combination with mechanical means for achieving a watertight joint. One of the important aspects of the present invention is that the in-line filter unit introduces only a minimum amount of pressure drop into the system. This is achieved by the overall design of the unit including the spacing of the active unit 52 from the inner wall 84 of the housing 20, from the inner wall 86 of the end cap assembly 64, as well as from the inner wall 88 of the exit cap assembly 56. This allows the water to bear against a maximum surface of the filter 52 as well as to form a cavity in which the sand particles and other debris collects. A reassembly sized cavity is desirable because maintenance calls to clear out the cavity can be reasonably spaced apart in time.

A water diffuser 90 protects that portion of the filter positioned in line with the flow of water into the filter. The diffuser 90 diverts the water around the filter and prevents the water flow from eroding the filter.

Additionally, it has been found through experience that the diffuser 90 should be spaced at least one-half inch away from the end 92 of the input bore 74. A closer placement can damage the unit when an epoxy coating is used as the diffuser, or a fiber glass resin coating or a molten glass coating. The booster pump 14 typically operates at 40 pounds pressure.

Referring to FIG. 5, there can be seen a perspective view of a third embodiment of the present invention which utilizes a two piece construction.

There can be seen an exploded view of the embodiment of the present invention shown in FIG. 5. Generally, as shown in FIGS. 5 and 6 an annular shaped casing 20 is the main housing for the filter unit. The casing defines a central bore as at 20a and an input member 20b and an output member 20c. The unit shown is of unitized construction for in-line filter unit. The housing 20 is the main housing for the filter unit. The housing 20 is equipped with integrally formed exit end cap 22 having an axially formed exit port 24 containing a threaded hardware member element 34. The member 34 provides a means for connecting the filter unit to the plumbing normally found in a swimming pool system. The member 34 is a ¾ inch threaded pipe.

The input member 20b is provided with an annular shaped inner extension at 100 adapted to be received by an annular shaped outer extension at 102 carried by the output member 20c. An adhesive is placed on mating surfaces 104 and/or 106 for joining the input member 20b to the output member 20c into a unitized construction.

The output member 20c has an integrally formed end cap 108 which carries a pair of inwardly extending, spaced apart flanges 110 and 112. Flange 112 includes an outer surface 114 for receiving the inner surface 116 of a filter element 52. Flange 110 includes a surface 118 against which the filter element 52 rests.

In the preferred embodiment, the filter element 52 is a resin bonded quartz filter which is attached to the flange 112 by an epoxy adhesive. An integrally attached threaded exit element 120 is a circular shaped ¾ inch element having a threaded portion adapted to mate with the plumbing in the pool set-up.

The function of the exit end cap 108 is to perform the closure function for one end of the housing 20 in addition to carrying the exit element 120 which attaches to the existing plumbing for a swimming pool. Additionally, the end cap 108 supports the active filter element 52.

A water diffuser 90 protects that portion of the filter positioned in line with the flow of water into the filter. The diffuser 90 diverts the water around the filter and prevents the water flow from eroding the filter.

Additionally, it has been found through experience that the diffuser 90 should be spaced at least one-half inch away from the end 92 of the input bore 74. In this embodiment, the diffuser 90 comprises a main body element 122 carrying input end spacers 124 which rest against the inner wall 126 of the input end cap 22 and carrying output end spacers 128 which are inserted between adjacent vanes 130 formed as part of the filter element shown in this embodiment. The exit end surface 132 of the diffuser rests against the filter element 52. A centrally located member 134 rises above the input surface 136 of the diffuser 90.

What is claimed is:

1. In a pressurized water system for a pool cleaning system operating at substantially 40 pounds pressure, and having a primary filter unit employing a filtering substance selected from the group of sand diatomaceous earth, and which primary filter unit allows minute portions of its filtering substance to escape into the return line for the pool, and a pool cleaning system responsive to the pressurized water for cleaning the pool and having intricate pressurized water responsive plastic mechanical parts subject to malfunction when the filtering substance is trapped in the pressurized water responsive plastic mechanical parts, and which cleaning system is designed for use with a minimum predetermined water pressure, an in-line filter adapted to be placed intermediate the primary filter unit and the pressurized water responsive plastic mechanical parts for removing said filtering substance without a drop in pressure below said predetermined water pressure, said in-line filter unit comprising:

a housing member of annular shape defining a central bore and having an input end and an output end and having an inner surface;

an input end cap assembly in mating water-tight attachment with said input end of said member and carrying water input means for attaching to one point in the pressurized water system;

an output end cap assembly in mating water-tight attachment to said output end of said member and carrying a water output means for attaching to a second point of the pressurized water system and also carrying fused quartz filter element means located within said housing for filtering the fluid flowing in said system for removing the filtering substance inadvertently escaping from the primary filter;

said filter element being in spaced relationship at least over a portion of its length from said inner surface of said housing for providing a surface for contacting the water to be filtered and for providing a fluid to filter surface area of contact for reducing the resistance to the water flowing through the filter, and for providing a chamber for collecting the filtering substance inadvertently escaping from the primary filter;

said filter element means being adapted for filtering all the water passing through said in-line filter;

Fluid diffuser means carried by said filter element and positioned intermediate said water input means and said filter for preventing direct contact with said filter by the direct flow of water entering the in-line filter through said water input means for preventing damage to said filter by said direct water flow, and said fluid diffuser means diverts the direct flow of water away from that portion of said fused quartz filter, which portion is positioned in-line with the flow of water into the filter for preventing erosion of said fused quartz filter.

2. An in-line filter as recited in claim 1 wherein said filter element means is made in one piece for one time use and is discarded when said chamber is sufficiently filled with said filtering substance.

3. An in-line filter unit as recited in claim 1 wherein said filter is made for disassembling for cleaning of said chamber of filtering substance inadvertently escaping, from the primary filter unit and for reassembling for reattachment in said pressurized water system.

4. An in-line filter unit as recited in claim 1, wherein said diffuser means is located at least one-half inch from the direct flow of water exiting said input cap assembly.

5. An in-line filter unit for use in a pressurized fluid system comprising:
   a housing member of annular shape defining a central bore and having an input end member and an output end member; and having an inner surface;
   said input member in mating fluid tight attachment with said output end member, and said input member carrying fluid input means for attaching to one point of the pressurized fluid system;
   said output member carrying fluid output means for attaching to a second point of the pressurized fluid system and also carrying a fused quartz filter element means located within said housing for filtering the fluid flowing in said system;
   said filter element means being in spaced relationship at least over a portion of its length from said inner surface of said housing for providing a surface for contacting the fluid to be filtered and for providing a fluid to filter surface area of contact for reducing the resistance to the fluid flowing through the filter, and for providing a chamber for collecting the material to be removed from the fluid flow; and
   fluid diffuser means carried by said filter element and positioned intermediate said fluid input means and said filter for preventing direct contact with said filter by the direct flow of fluid entering the in-line filter through said fluid input means for preventing damage to said filter by said direct fluid flow, and said fluid diffuser means diverts the direct fluid flow away from that portion of said fused quartz filter, which portion is positioned in-line with the fluid flow into the the filter for preventing erosion of said fused quartz filter.

6. An in-line filter unit as recited in claim 5 wherein said filter is made in one piece for one time use and is thrown away when said chamber is sufficiently filled with debris and sand.

7. An in-line filter unit as recited in claim 5 wherein said filter is made for diassembling for cleaning of said chamber of debris and for reassembling for reattachment in said pressurized fluid system.

8. An in-line filter unit as recited in claim 5 wherein said diffuser means is spaced at least one-half inch from said end of said input element by spacers carried by said diffuser.

9. In a pressurized water system for a pool cleaning system operating at substantially 40 pounds pressure, and having a primary filter unit employing a filtering substance selected from the group of sand and diatomaceous earth, and which primary filter unit allows minute portions of its filtering substance to escape into the return line and then into the pool, and a pool cleaning system responsive to the pressurized water for cleaning the pool and having intricate pressurized water responsive plastic mechanical parts subject to malfunction when the filtering substance is trapped in the mechanical parts, and which cleaning system is designed for use with a minimum predetermined water pressure, a unitized in-line filter adapted to be placed intermediate the primary filter unit and the pressurized water responsive plastic mechanical parts for removing said filtering substance without a drop in pressure below said predetermined water pressure, said in-line filter unit comprising:
   a housing member of annular shape defining a central bore and having an input end member and an output end member and having an inner surface;
   said input end member being in mating water-tight attachment with said output end member and carrying water input means for attaching to one point in the pressurized water system;
   said output end member carrying water output means for attaching to a second point of the pressurized water system and also carrying fused quartz filter element means located within said housing for filtering the fluid flowing in said system for removing the filtering substance inadvertently escaping from the primary filter;
   said filter element being in spaced relationship at least over a portion of its length from said inner surface of said housing for providing a surface for contacting the water to be filtered and for providing a fluid to filter surface area of contact for reducing the resistance to the water flowing through the filter, and for providing a chamber for collecting the filtering substance inadvertently escaping from the primary filter;
   said filter element means being adapted for filtering all the water passing through said in-line filter;
   fluid diffuser means carried by said filter element and positioned intermediate said water input means and said filter for preventing direct contact by the direct flow of water entering the in-line filter through said water input means for preventing damage to said filter by said direct water flow and said fluid diffuser means diverts the direct flow of water away from that portion of said fused quartz filter, which portion is positioned in-line with the flow of water into the filter for preventing erosion of said fused quartz filter.

10. An in-line filter as recited in claim 9 wherein said filter element means is made in one piece for one time use and is discarded when said chamber is sufficiently filled with said filtering substance.

11. An in-line filter unit as recited in claim 9 wherein said filter is made for disassembling for cleaning of said chamber of filtering substance inadvertently escaping, from the primary filter unit and for reassembling for reattachment in said pressurized water system.

12. An in-line filter unit as recited in claim 9, wherein said diffuser means is located at least one-half inch from the direct flow of water exiting said input cap assembly.

* * * * *